June 2, 1936.  G. H. GOEDDEKE  2,043,041
BICYCLE MUDGUARD CLAMP
Filed Aug. 1, 1935
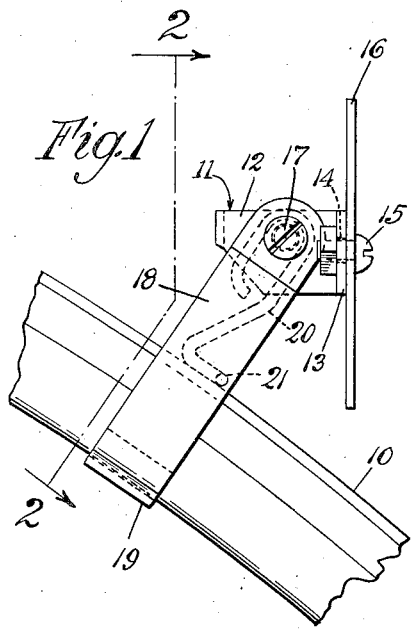
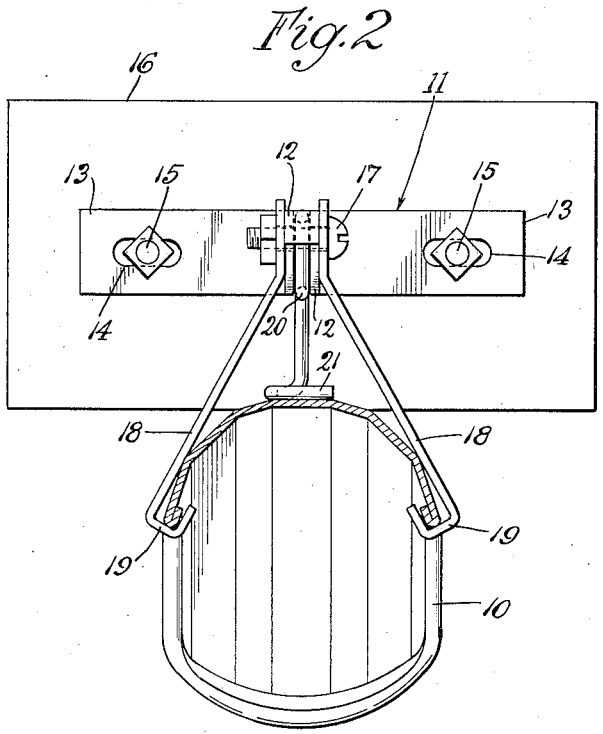
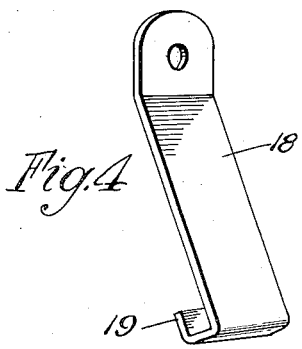
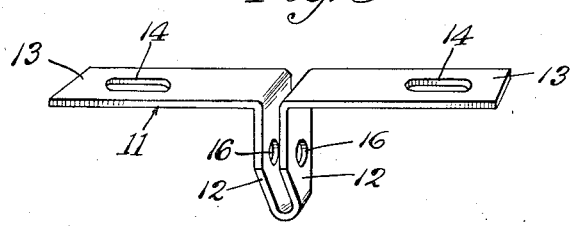
Inventor
GEORGE H. GOEDDEKE
by Maxwell F. Cargill
Attorney.

Patented June 2, 1936

2,043,041

UNITED STATES PATENT OFFICE 2,043,041

BICYCLE MUDGUARD CLAMP

George H. Goeddeke, Itasca, Ill.

Application August 1, 1935, Serial No. 34,207

2 Claims. (Cl. 248—226)

This invention relates to improvements in bicycle mud guard clamps.

One object of the invention is to provide a clamp which can readily be attached to a mud guard of a bicycle for supporting a member such as a license plate, name plate or other indicia bearing member, or other appropriate member which the user may wish to attach to his bicycle.

Another object of the invention is to provide a clamp provided with a pair of clamp arms arranged for engaging the edges of a mud guard to support a member in the desired position and having an adjustable thrust resisting member for resisting movement in a direction to release the arms from the guard.

Other objects relate to various features of construction and arrangement of parts which will be apparent from a consideration of the following specification and accompanying drawing, wherein:

Figure 1 is a broken side elevation of a bicycle mud guard showing an embodiment of my improvements in position thereon.

Figure 2 is a partial sectional view taken on line 2—2 of Figure 1.

Figure 3 is a perspective view of the clamp bracket.

Figure 4 is a perspective view of one of two identical clamp arms.

In the drawing 10 is a conventional rear mud guard of a bicycle. The clamp comprises a bracket indicated generally by the numeral 11, which is shown in perspective in Figure 3. It will be noted that the bracket is formed of one piece of metal folded at its middle to form spaced walls 12, and each terminating in a flange 13. Each of the flanges has an elongated opening 14 therein for the reception of a bolt 15, by means of which the plate 16 or other device to be supported may be attached thereto. The bracket walls 12 are provided with aligned openings 16 through which a bolt 17 can be passed for frictionally securing thereto the upper ends of the clamp arms 18. The arms 18 are provided with hooks 19 at the lower ends which are adapted to engage the edges of the mud guard as shown in Figure 2.

To restrain movement of the clamp in a direction to spread the arms 18 and release the hooks 19 from engagement with the mud guard and thus permit the clamp to become accidentally detached, a thrust resisting member 20 is provided. This member may be formed of wire and is shaped to provide a slot adjacent its upper end through which the bolt 17 passes, as shown in Figure 1, while the lower end is shaped to form a foot 21 which bears against the upper surface of the mud guard as shown in Figure 2. The member 20 is disposed between the two walls 12 of the bracket, and hence when the bolt 17 is tightened to clamp the upper ends of the arms 18 frictionally against the outer faces of the walls 12, the inner faces thereof will simultaneously be tightened against the member 20.

This arrangement, as will be seen, resists movement of the bracket toward the mud guard and hence prevents spreading of the arms 18 and dislodgment and loss of the clamp. Since mud guards vary in size and contour in different makes and sizes of bicycles, the angularity of the arms 18 can be changed by bending the metal of which they are formed as may be necessary in any particular instance, and due to the slot formation of the upper end of the member 20 it can be adjusted so as to bear firmly against the surface of mud guards of different sizes.

While I have shown and described an embodiment of my improvements for the purpose of illustration, I do not wish to be restricted specifically thereto except as so limited by the appended claims.

I claim:

1. A clamp comprising a pair of arms having hooks at the lower ends for engaging the edges of a mud guard, an article supporting bracket interposed between the opposite ends of said arms, means for tightening said ends to said bracket for retaining the same in adjusted position, and a member secured by said means and contacting with said guard to resist movement of the arms in a direction to release said hooks.

2. A clamp comprising a pair of arms having hooks at the lower ends for engaging the edges of a mud guard, a U-shaped bracket interposed between the opposite ends of said arms, a thrust resisting member adjustably disposed in said bracket and extending into contact with said guard for resisting movement of said arms in a direction to release said hooks, and means for tightening the upper ends of said arms to said bracket and the latter to said thrust resisting member to retain the clamp in position.

GEORGE H. GOEDDEKE.